US012798257B2

(12) United States Patent
Kim et al.

(10) Patent No.: US 12,798,257 B2
(45) Date of Patent: Nov. 17, 2026

(54) MANUFACTURING METHOD OF THE MATERIALS AND THE PARTS WITH LOW DIELECTRIC CONSTANT AND LOW DIELECTRIC LOSS BY INKJET PRINTING

(71) Applicant: CRHM Co., Ltd., Seoul (KR)

(72) Inventors: Jong Hee Kim, Seoul (KR); Seongkeun Ih, Suwon-si (KR)

(73) Assignee: CRHM CO., LTD., Seoul (KR)

( * ) Notice: Subject to any disclaimer, the term of this patent is extended or adjusted under 35 U.S.C. 154(b) by 312 days.

(21) Appl. No.: 18/582,792

(22) Filed: Feb. 21, 2024

(65) Prior Publication Data

US 2024/0316948 A1 Sep. 26, 2024

(30) Foreign Application Priority Data

Mar. 23, 2023 (KR) ........................ 10-2023-0038273
Jan. 29, 2024 (KR) ........................ 10-2024-0013492

(51) Int. Cl.

| | |
|---|---|
| ***B41J 2/21*** | (2006.01) |
| ***B41J 2/205*** | (2006.01) |
| ***B41J 11/00*** | (2006.01) |
| ***B82Y 30/00*** | (2011.01) |
| ***C09D 11/30*** | (2014.01) |

(52) U.S. Cl.

CPC ............. *B41J 2/211* (2013.01); *B41J 2/2054* (2013.01); *B41J 11/00244* (2021.01); *C09D 11/30* (2013.01); *B82Y 30/00* (2013.01)

(58) Field of Classification Search

CPC ........................................................ B41J 2/211
See application file for complete search history.

(56) References Cited

U.S. PATENT DOCUMENTS

| | | | | |
|---|---|---|---|---|
| 6,110,266 | A | 8/2000 | Gonzalez-Blanco et al. | |
| 11,795,337 | B2 | 10/2023 | Wallace et al. | |
| 11,945,959 | B2 | 4/2024 | Wallace et al. | |
| 2004/0127393 | A1* | 7/2004 | Valpey, III ........ | D06M 15/6436 510/511 |
| 2014/0340854 | A1* | 11/2014 | Akiyama .............. | B05D 1/322 427/126.3 |
| 2019/0337013 | A1* | 11/2019 | Dadheech ............. | B05D 3/107 |

(Continued)

FOREIGN PATENT DOCUMENTS

| | | | |
|---|---|---|---|
| CN | 112876903 | A | 6/2021 |
| KR | 1999-0045051 | A | 6/1999 |

(Continued)

OTHER PUBLICATIONS

Office Action issued on Aug. 27, 2025, for corresponding Korean Patent Application No. 10-2024-0013492, along with an English machine translation (16 pages).

(Continued)

*Primary Examiner* — Robert A Vetere
(74) *Attorney, Agent, or Firm* — Hauptman Ham, LLP

(57) ABSTRACT

Disclosed is a method for manufacturing a low dielectric constant and low dielectric loss material and part using inkjet printing. More specifically, disclosed is a method for manufacturing a low dielectric constant and low dielectric loss material and part by coating and heat-treating an ink composition containing fluoropolymer nanoparticles, ceramic nanoparticles, and polymer dispersant on a substrate.

14 Claims, 11 Drawing Sheets

(56) References Cited

U.S. PATENT DOCUMENTS

| | | | |
|---|---|---|---|
| 2023/0242781 | A1 | 8/2023 | Wallace et al. |
| 2023/0348744 | A1 | 11/2023 | Wallace et al. |

FOREIGN PATENT DOCUMENTS

| | | | |
|---|---|---|---|
| KR | 10-2019-0098364 | A | 8/2019 |
| KR | 10-2021-0052328 | A | 5/2021 |
| KR | 10-2023-0029984 | A | 3/2023 |

OTHER PUBLICATIONS

Notice of Allowance issued on Jun. 1, 2026 for corresponding Korean Patent Application No. 10-2024-0013492, along with an English machine translation. (4 pages).

* cited by examiner

MANUFACTURING METHOD OF THE MATERIALS AND THE PARTS WITH LOW DIELECTRIC CONSTANT AND LOW DIELECTRIC LOSS BY INKJET PRINTING

CROSS-REFERENCE TO RELATED APPLICATION

This application claims priority from Korean Patent Applications No. 10-2024-0013492 filed on Jan. 29, 2024 and No. 10-2023-0038273 filed on Mar. 23, 2023 in the Korean Intellectual Property Office, and all the benefits accruing therefrom under 35 U.S.C. 119, the contents of which in its entirety are herein incorporated by reference.

BACKGROUND

Field

The present disclosure relates to a method for manufacturing a low dielectric constant and low dielectric loss material and part using inkjet printing. More specifically, the present disclosure relates to a method for manufacturing a low dielectric constant and low dielectric loss material and part by coating and heat-treating an ink composition containing fluoropolymer nanoparticles, ceramic nanoparticles, and polymer dispersant on a substrate.

Description of Related Art

Currently, 5th generation and later wireless communication technologies require the use of ultra-high frequencies to process large amounts of data and achieve fast transmission speeds. The existing FR-4 circuit board made of epoxy resin and glass fiber has high dielectric loss in the ultra-high frequency range. For this reason, the development of a new circuit board with low dielectric constant and low dielectric loss characteristics for ultra-high frequency circuits is required. Accordingly, a CCL (copper clad laminate) substrate using liquid crystal polymers, polytetrafluoroethylene (PTFE), etc. is being developed as a circuit board for the ultra-high frequency range.

A liquid crystal polymer (LCP) which has recently emerged is used to manufacture the circuit board. In this case, imprecise numerical control and poor adhesion are caused during heat compression for circuit board production.

The polytetrafluoroethylene is used to manufacture the circuit board. In this case, it is difficult to change a shape due to its high viscosity in a molten state. Further, complex and multi-step processes such as photolithography on a laminate material is required. Thus, polytetrafluoroethylene is only used for limited purposes, such as manufacturing expensive parts in the defense and satellite communications fields. However, it is difficult to apply polytetrafluoroethylene to civilian applications that require mass production because the material thereof and a process thereon are expensive.

Therefore, it is necessary to develop technology that may solve the above problems and can manufacture a circuit board of complex and diverse shapes using a material that may exhibit low dielectric constant and low dielectric loss characteristics.

SUMMARY

The present disclosure is intended to achieve the purpose as described above. Thus, a purpose of the present disclosure is to provide a nano ink printing method that prints and heat-treats, on a substrate, an ink composition containing fluoropolymer nanoparticles and a polymer dispersant that can be uniformly printed on the substrate.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A first aspect of the present disclosure provides a method for preparation of a nanoparticle-based ink composition for inkjet printing, the method comprising: (S10) mixing and dispersing a first dispersant with and in a first solvent; (S20) mixing and dispersing fluoropolymer nanoparticles with and in a resultant product of (S10); and (S30) mixing and dispersing a first modifier with and in a resultant product of (S20).

In one embodiment of the first aspect, the method further comprises: after (S30), (S40) mixing and dispersing a second dispersant with and in a second solvent; (S50) mixing and dispersing ceramic nanoparticles with and in a resultant product of (S40); (S60) mixing and dispersing a second modifier with and in a resultant product of (S50); and (S70) mixing a resultant product of (S30) and a resultant product of (S60) with each other and dispersing a mixture thereof.

In one embodiment of the first aspect, the first dispersant includes at least one selected from a group consisting of a hydrocarbon-based compound, a chlorinated hydrocarbon-based compound, a cyclic ether-based compound, a ketone-based compound, an alcohol-based compound, a polyhydric alcohol-based compound, an acetate-based compound, a polyhydric alcohol and ether-based compound, and a terpene-based compound.

In one embodiment of the first aspect, the second dispersant includes at least one selected from a group consisting of a compound represented by a following Chemical Formula 2 and a compound represented by a following Chemical Formula 3:

[Chemical Formula 2]

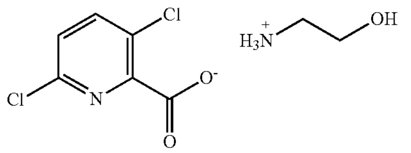

[Chemical Formula 3]

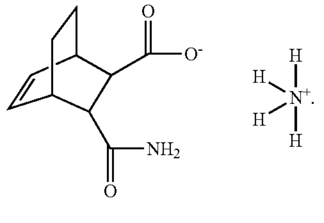

In one embodiment of the first aspect, the first dispersant is mixed with the first solvent and thus is diluted therewith, wherein a mixing weight ratio of the first dispersant and the first solvent is in a range of 1:5 to 1:500.

In one embodiment of the first aspect, the first modifier is mixed with the first solvent and thus is diluted therewith, wherein a mixing weight ratio of the first solvent and the first modifier is in a range of 1:0.5 to 1:9.

In one embodiment of the first aspect, a mixing weight ratio of the fluoropolymer nanoparticles and the first dispersant is in a range of 1:0.5 to 1:40.

In one embodiment of the first aspect, a diameter of each of the fluoropolymer nanoparticles is in a range of 0.05 μm to 5 μm.

In one embodiment of the first aspect, a mixing volume ratio of the ceramic nanoparticles and the fluoropolymer nanoparticles is in a range of 1:1 to 1:30.

In one embodiment of the first aspect, the first solvent and the second solvent are identical with or different from each other, wherein each of the first solvent and the second solvent includes at least one selected from a group consisting of deionized water, an alcohol compound, a glycol compound, a ketone compound, an ether compound, an ester compound, an imide compound, and an amide compound.

In one embodiment of the first aspect, the fluoropolymer nanoparticle includes at least one selected from a group consisting of a polytetrafluoroethylene (PTFE) nanoparticle, a fluoroethylenepropylene (FEP) nanoparticle, an ethylenetetrafluoroethylene (ETFE) nanoparticle, and a perfluoroalkoxy (PFA) nanoparticle.

In one embodiment of the first aspect, the ceramic nanoparticle includes at least one selected from a group consisting of a barium titanate nanoparticle, an aluminum oxide nanoparticle, an aluminum nitride nanoparticle, a boron nitride nanoparticle, a silicon carbide nanoparticle, and a beryllium oxide nanoparticle.

A second aspect of the present disclosure provides a nano inkjet printing method, the method comprising: preparing a nanoparticle-based ink composition for inkjet printing using the method for preparation of the nanoparticle-based ink composition for inkjet printing as described above; printing the nanoparticle-based ink composition on a substrate using an inkjet printer; and heat-treating the printed nanoparticle-based ink composition to form a thin film.

In one embodiment of the second aspect, in the nanoparticle-based ink composition, a mixing volume ratio of the ceramic nanoparticles and the fluoropolymer nanoparticles is in a range of 1:1 to 1:30.

In one embodiment of the second aspect, the method further comprises adjusting a content of air contained in the thin film.

In one embodiment of the second aspect, adjusting the content of the air contained in the thin film includes adjusting the content of the air such that a volume percentage of the air is in a range of 15 to 50% based on 100 volume percentage of the thin film.

In one embodiment of the second aspect, adjusting the content of the air contained in the thin film includes at least one of: adjusting a spacing between ink droplets in printing the nanoparticle-based ink composition using the inkjet printer; adjusting a packing density of the fluoropolymer nanoparticles in the nanoparticle-based ink composition; including a mixture of two or more types of the fluoropolymer nanoparticles having different particle sizes in the nanoparticle-based ink composition; including a mixture of two or more types of the ceramic nanoparticles having different particle sizes in the nanoparticle-based ink composition; or including a mixture of two or more types of the fluoropolymer nanoparticles having different particle sizes, and a mixture of two or more types of the ceramic nanoparticles having different particle sizes in the nanoparticle-based ink composition.

In one embodiment of the second aspect, the heat-treatment is performed at a temperature of 180° C. to 420° C. for 1 hour to 12 hours.

In one embodiment of the second aspect, a dielectric constant (Dk) of the thin film is adjusted to be in a range of 1.5 to 2.0, wherein a dielectric loss (Df) of the thin film is adjusted to be in a range of $1.7\times10^{-4}$ to $2.6\times10^{-4}$.

The method for preparation of the nanoparticle-based ink composition for inkjet printing and the nano inkjet printing method according to the present disclosure may realize the circuit board of complex and diverse shapes using the material with low dielectric constant and low dielectric loss characteristics. Thus, designing or design modification may be variously made, and a cost and a time required for prototyping may be greatly reduced.

Specifically, the nano inkjet printing method according to the present disclosure may form a uniform internal structure in a single process and thus may control a content of pores in the thin film, and thus may provide the fluoropolymer based thin film with better dielectric properties than existing fluoropolymer based thin films. Because the inkjet printing scheme is applied, films of various shapes may be manufactured precisely, and high process efficiency and cost-effectiveness may be achieved through a single process.

In particular, the inkjet printing scheme according to the present disclosure may form a three-dimensional shape through repetitive stacking of two-dimensional cross-sections based on digital data designed in a DOD (Drop On Demand) manner. Further, a precise process may be implemented that may control a value down to several micrometers depending on the content and the ingredient of the ink, and the stacking scheme.

In addition, the inkjet printing scheme according to the present disclosure allows control of a filling density, which means that unlike the existing CCL manufacturing process, internal pores may be formed in the film. Adjusting the content of the air with the lowest dielectric constant and lowest dielectric loss may allow the content of the air with low dielectric constant and low dielectric loss to be selectively determined. Accordingly, the dielectric constant and dielectric loss values of the thin film manufactured according to the inkjet printing method may be adjusted. Therefore, the circuit board manufactured using the fluoropolymer-based ink composition as prepared using the method for preparation of the nanoparticle-based ink composition for inkjet printing according to the present disclosure in the inkjet printing scheme may exhibit better dielectric properties in the ultra-high frequency range, compared to the fluoropolymer-based circuit board manufactured by a conventional method.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

DETAILED DESCRIPTIONS

Figure 1:
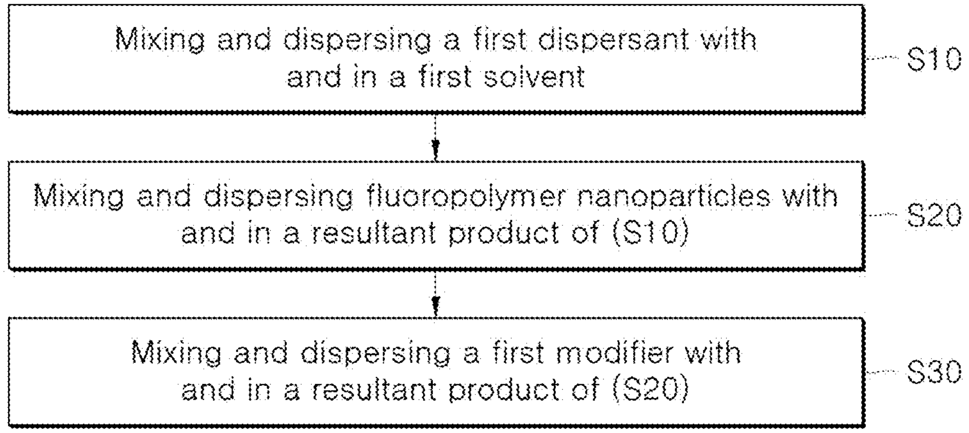
FIG. 1 shows a flow chart of a method for preparation of a nanoparticle-based ink composition for inkjet printing according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but may be embodied in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be embodied differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be embodied independently of each other and may be embodied together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects", and the like should not be construed such that any aspect or design as described is superior to or advantageous over other aspects or designs.

FIG. 1 shows a method for preparation of a nanoparticle-based ink composition for inkjet printing according one embodiment of the present disclosure. As shown in FIG. 1, the method for preparation of the nanoparticle-based ink composition for inkjet printing may include (S10) mixing and dispersing first dispersant with and in a first solvent; (S20) mixing and dispersing fluoropolymer nanoparticles with and in a resultant product of step (S10); and (S30) mixing and dispersing the first modifier with and in a resultant product of step (S20).

In the first step (S10), the first dispersant may include one or more selected from a hydrocarbon-based compound, a chlorinated hydrocarbon-based compound, a cyclic ether-based compound, a ketone-based compound, an alcohol-based compound, a polyhydric alcohol-based compound, an acetate-based compound, a polyhydric alcohol and ether-based compound, and a terpene-based compound.

In particular, in terms of dispersibility of the first dispersant relative to the fluoropolymer nanoparticles, the first dispersant is preferably an alcohol-based compound. For example, the first dispersant may be an alcohol-based compound represented by a following [Chemical Formula 1]:

[Chemical Formula 1]

$$C_{12}H_{25}(OCH_2CH_2)_4OH$$

The first dispersant may be mixed and thus diluted with the first solvent, and in this case, the mixing weight ratio of the first dispersant and the first solvent may be in a range of 1:5 to 1:500 from the viewpoint of dispersibility.

The dispersion in the first step (S10) is preferably performed for 10 to 60 minutes using a homogenizer.

In the second step (S20), mixing and dispersing the fluoropolymer nanoparticles with and in the first dispersant is a step of preparing a uniform ink composition by dispersing the fluoropolymer nanoparticles in the first dispersant (polymer dispersant).

The dispersion in the second step (S20) is preferably performed for 30 minutes to 3 hours using a homogenizer.

In this regard, the mixing weight ratio of the fluoropolymer nanoparticles and the first dispersant may be in a range of 1:0.01 to 1:0.3.

In the third step (S30), the first modifier may include one or more selected from deionized water, glycol compounds, alcohol compounds, ketone compounds, ether compounds, ester compounds, imide compounds, and amide compounds. Mixing and dispersing the first modifier is to adjust the viscosity of the ink composition to satisfy an appropriate printing condition in the inkjet printing process.

In the third step (S30), the first modifier may be mixed with the first solvent and thus may be dispersed in a diluted state therewith. In this regard, the mixing weight ratio of the first solvent and the first modifier may be in a range of 1:0.5 to 1:9. Within the above range, the dispersibility of the fluoropolymer nanoparticles may be improved, and a uniform thin film thickness may be obtained.

The first solvent may include one or more selected from deionized water, alcohol compounds, glycol compounds, ketone compounds, ether compounds, ester compounds, imide compounds, and amide compounds.

Unlike the present disclosure, (S10) mixing and dispersing first dispersant with and in a first solvent; (S20) mixing and dispersing fluoropolymer nanoparticles with and in a resultant product of step (S10); and (S30) mixing and dispersing the first modifier with and in a resultant product of step (S20) may not be performed sequentially. Rather, at least two of the mixings in S10, S20, and S30 may be performed at the same time. For example, the first dispersant, the first modifier and the fluoropolymer nanoparticles may be mixed with each other at the same time (S10, S20, S30), or the first dispersant and the first modifier may be mixed with each other at the same time (S10, S30) or the first dispersant and fluoropolymer nanoparticles be mixed with each other at the same time (S10, S20), or the first modifier and the fluoropolymer nanoparticles may be mixed with each other at the same time (S20, S30). In this case, the dispersant cannot be uniformly dispersed in the solvent. Thus, reduced dispersibility of the fluoropolymer nanoparticles or failure to disperse the fluoropolymer nanoparticles may occur. Thus, according to the present disclosure, (S10) mixing and dispersing first dispersant with and in a first solvent; (S20) mixing and dispersing fluoropolymer nanoparticles with and in a resultant product of step (S10); and (S30) mixing and dispersing the first modifier with and in a resultant product of step (S20) may be performed sequentially.

The fluoropolymer nanoparticles may have a diameter of 0.5 μm to 5 μm, more preferably 50 nm to 400 nm. If the diameter of the fluoropolymer nanoparticles is below the above range, it is difficult to prepare fine and uniformly sized nanoparticles. If the diameter of the fluoropolymer nanoparticles is above the above range, clogging is likely to occur in the inkjet nozzle and it is difficult to obtain a uniform thin film after coating.

In order to increase the packing percentage and the packing density of the fluoropolymer nanoparticles, it is more desirable to mix fluoropolymer nanoparticles of different diameters with each other at a certain mixing ratio. For example, the mass mixing ratio of first powders with a diameter of 0.5 μm to 3 μm and second powders with a diameter of 50 nm to 400 nm may be preferably in a range of 1:0.3 to 1:0.9, more preferably in a range of 1:0.5 to 1:0.6.

The fluoropolymer nanoparticle may include at least one selected from a group consisting of a polytetrafluoroethylene (PTFE) nanoparticle, a fluoroethylenepropylene (FEP) nanoparticle, an ethylenetetrafluoroethylene (ETFE) nanoparticle, and a perfluoroalkoxy (PFA) nanoparticle.

The fluoropolymer nanoparticle is made of a non-flammable fluoropolymer, is heat resistant, and has a low coefficient of friction, and has excellent chemical resistance. Therefore, the fluoropolymer thin film may have thermal stability.

Figure 2:
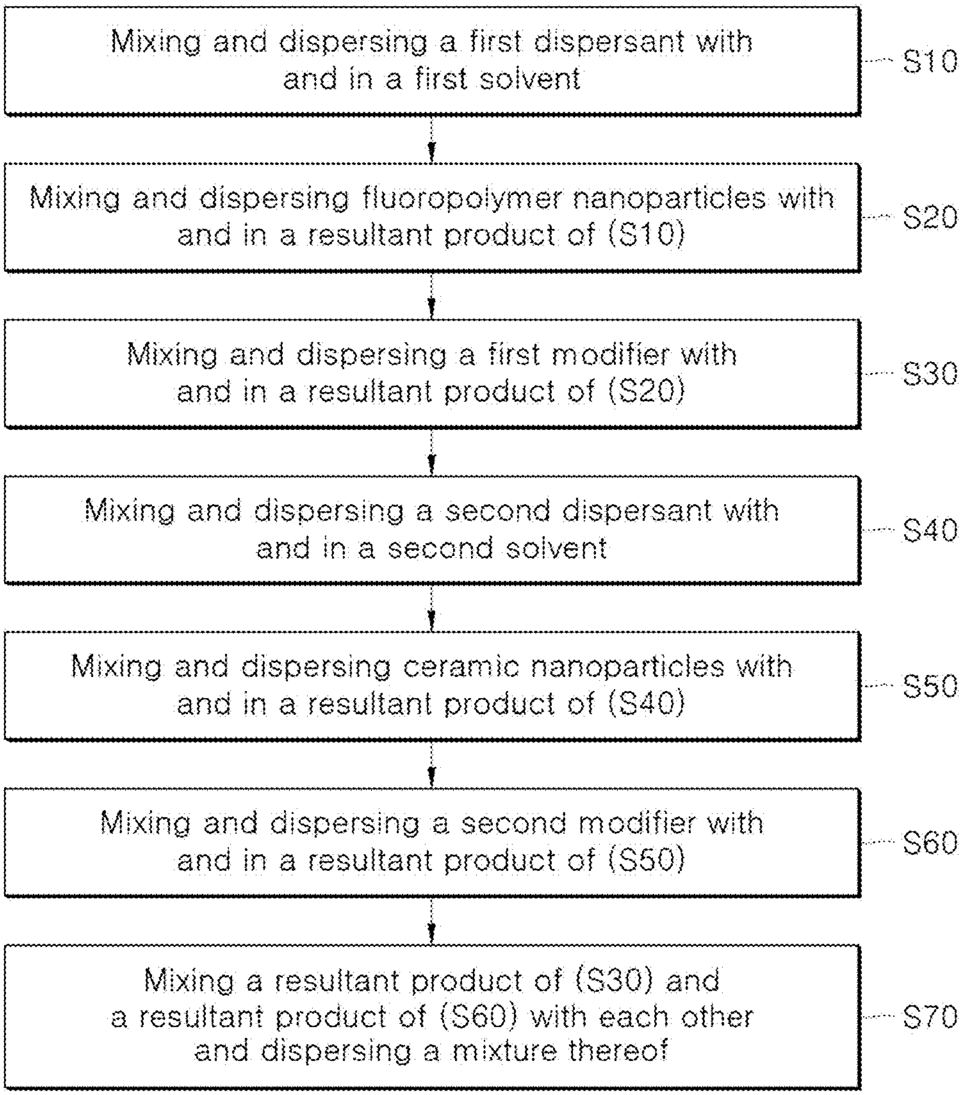
FIG. 2 shows a flow chart of a method for preparation of a nanoparticle-based ink composition for inkjet printing according to another embodiment of the present disclosure.

FIG. 2 shows a flow chart of a method for preparation of a nanoparticle-based ink composition for inkjet printing according to another embodiment of the present disclosure.

Referring to FIG. 2, the method for preparing the nanoparticle-based ink composition for inkjet printing according to the present disclosure may include (S10) mixing and dispersing a first dispersant with and in a first solvent; (S20) mixing and dispersing fluoropolymer nanoparticles with and in a resultant product of (S10); (S30) mixing and dispersing a first modifier with and in a resultant product of (S20); (S40) mixing and dispersing a second dispersant with and in a second solvent; (S50) mixing and dispersing ceramic nanoparticles with and in a resultant product of (S40); (S60) mixing and dispersing a second modifier with and in a resultant product of (S50); and (S70) mixing a resultant product of (S30) and a resultant product of (S60) with each other and dispersing a mixture thereof.

The first to third steps (S10) to (S3) in this embodiment are the same as those described in the method for preparing the nanoparticle-based ink composition for inkjet printing as a described above with reference to FIG. 1.

From the viewpoint of dispersibility of the second dispersant relative to the ceramic nanoparticles, the second dispersant may include a carboxylic acid salt compound. In one example, the second dispersant may include at least one selected from a group consisting of a compound represented by a following Chemical Formula 2 and a compound represented by a following Chemical Formula 3:

[Chemical Formula 2]

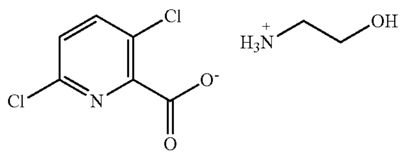

[Chemical Formula 3]

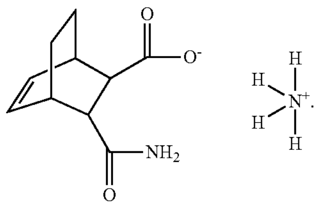

It is preferable from the viewpoint of dispersibility that a mixing weight ratio of the second dispersant and the ceramic nanoparticles is in a range of 1:0.01 to 1:0.3.

The second dispersant may be mixed with the second solvent, and thus may be diluted therewith. In this regard, a mixing weight ratio of the second dispersant and the second solvent may be in a range of 1:5 to 1:500 from the viewpoint of dispersibility.

The second solvent may include one or more selected from deionized water, alcohol compounds, glycol compounds, ketone compounds, ether compounds, ester compounds, imide compounds, and amide compounds. The first solvent and the second solvent may be the same as or different from each other.

The ceramic nanoparticles may include one or more selected from barium titanate nanoparticles, aluminum oxide nanoparticles, aluminum nitride nanoparticles, boron nitride nanoparticles, silicon carbide nanoparticles, and beryllium oxide nanoparticles.

The ceramic nanoparticles may be included therein to adjust the dielectric constant of the product. Since the dielectric constant tends to increase as the content of the ceramic particles increases, the mixing ratio of the ceramic nanoparticles must be adjusted according to a target dielectric constant value.

A mixing volume ratio of the ceramic nanoparticles and the fluoropolymer nanoparticles may be in a range of 1:1 to 1:30.

The second modifier may include one or more selected from deionized water, glycol compounds, alcohol compounds, ketone compounds, ether compounds, ester compounds, imide compounds, and amide compounds. Mixing and dispersing the second modifier is to adjust the viscosity of the ink composition to meet the appropriate printing condition in the inkjet printing process. The first modifier and the second modifier may be the same as or different from each other.

The dispersion in the fourth step (S40) is preferably performed for 10 to 60 minutes using a homogenizer.

In the fifth step (S50), mixing and dispersing the ceramic nanoparticles with and in the second dispersant is a step of preparing a uniform ink composition by dispersing the ceramic nanoparticles in the polymer dispersant.

The dispersion in the fifth step (S50) is preferably performed for 30 minutes to 3 hours using a homogenizer.

Mixing and dispersing the second modifier in the sixth step (S60) is to adjust the viscosity of the ink composition to meet the appropriate printing condition in the inkjet printing process.

In the seventh step (S70), the mixture of the third step (S30) and the mixture of the sixth step (S60) may be mixed with each other and may be subjected to dispersion to complete a final ink composition, that is, the fluoropolymer-ceramic nanoparticle-based ink composition.

The dispersion in the seventh step (S70) is preferably performed for 30 minutes to 3 hours using a homogenizer.

When the sequential mixing steps are not performed, a more simplified mixing step may be performed. However, the fluoropolymer nanoparticles and the ceramic nanoparticles may be uniformly dispersed through the sequential mixing steps with the first dispersant, the second dispersant, the first modifier, and the second modifier, thereby increasing the dispersibility of the fluoropolymer nanoparticles and the ceramic nanoparticles and preventing the fluoropolymer nanoparticles and the ceramic nanoparticles from being not dispersed. After performing the first to third steps and the fourth to sixth steps, the mixture of the third step and the mixture of the sixth step are mixed with each other. Thus, mutual interference between the first dispersant and the second dispersant may be suppressed and dispersibility may be increased. In conclusion, it is preferable that the mixing steps are performed according to the order as set herein.

Figure 3:
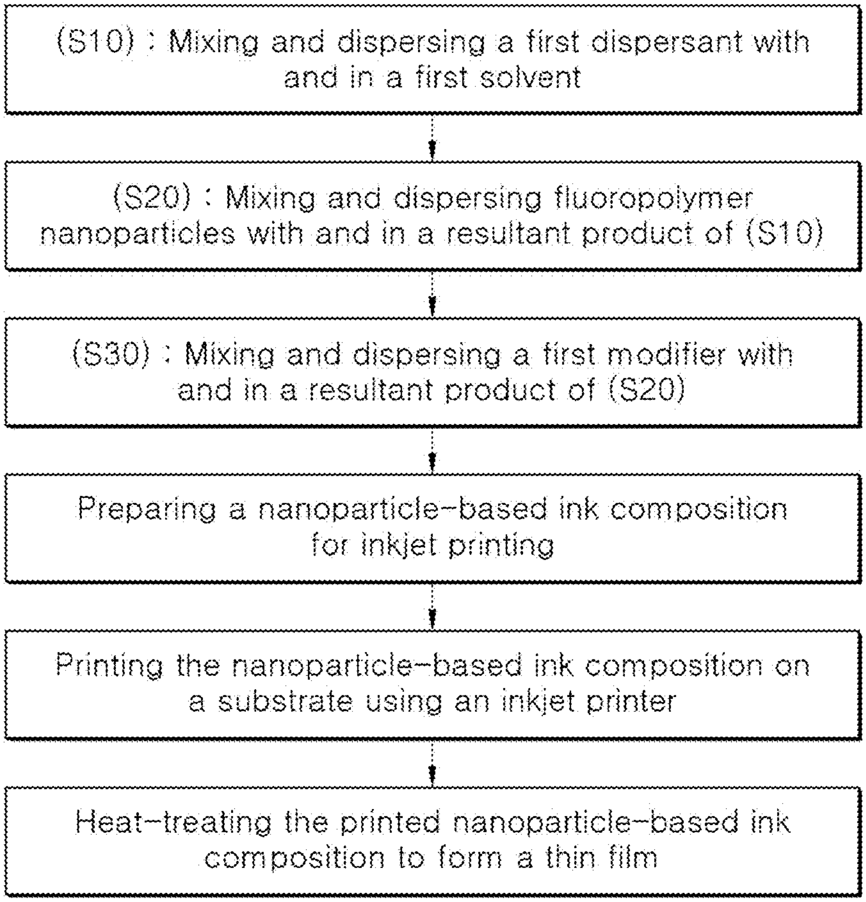
FIG. 3 shows a flow chart of a method for inkjet printing a nanoparticle-based ink composition for inkjet printing according to an embodiment of the present disclosure.

Referring to FIG. 3, a nano inkjet printing method may include preparing a nanoparticle-based ink composition for inkjet printing using the method for preparation of the nanoparticle-based ink composition for inkjet printing as described above as described above with reference to FIG. 1 including steps (S10) to (S30); printing the nanoparticle-based ink composition on a substrate using an inkjet printer; and heat-treating the printed nanoparticle-based ink composition to form a thin film.

Figure 4:
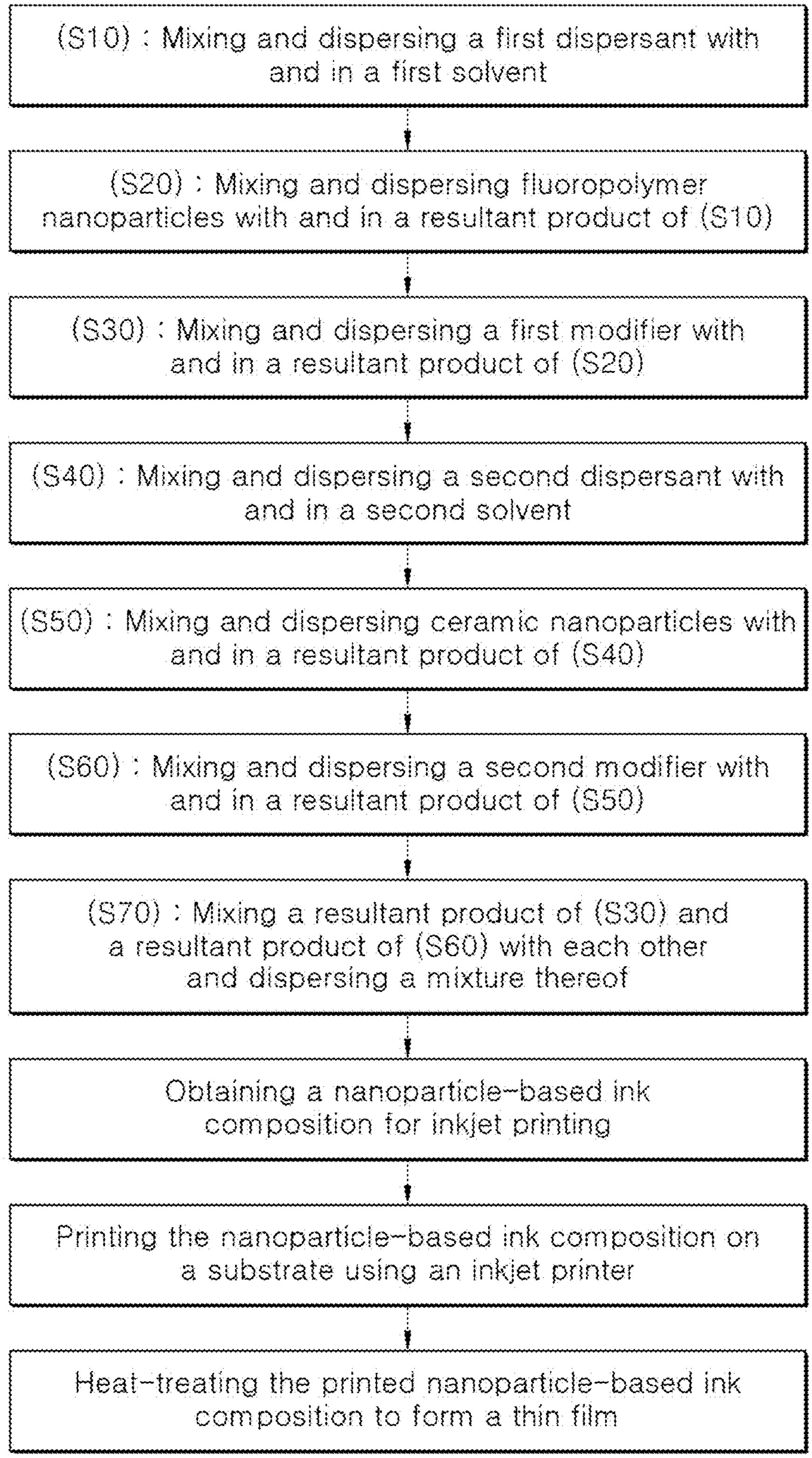
FIG. 4 shows a flow chart of a method for inkjet printing a nanoparticle-based ink composition for inkjet printing according to another embodiment of the present disclosure.

Referring to FIG. 4, a nano inkjet printing method may include preparing a nanoparticle-based ink composition for inkjet printing using the method for preparation of the nanoparticle-based ink composition for inkjet printing as described above as described above with reference to FIG. 2 including steps (S10) to (S70); printing the nanoparticle-based ink composition on a substrate using an inkjet printer; and heat-treating the printed nanoparticle-based ink composition to form a thin film.

Since steps (S10) to (S70) are the same as those described above with reference to FIG. 1 and FIG. 2, detailed descriptions thereof are omitted below.

In particular, the nano inkjet printing method according to the present disclosure may adjust the content of the air contained in the thin film or form the thin film via the heat-treatment.

The nanoparticle-based ink composition for inkjet printing as prepared using the method according to the present disclosure may be printed on the substrate using the inkjet printer while adjusting the air content, such that the fluoropolymer nanoparticles may be printed on the substrate in a dispersed state.

According to the nano inkjet printing method according to the present disclosure, the content of the air contained in the thin film may be controlled.

In one embodiment, in the nanoparticle-based ink composition, a mixing volume ratio of the ceramic nanoparticles and the fluoropolymer nanoparticles is in a range of 1:1 to 1:30.

In one embodiment, the nano inkjet printing method according to the present disclosure further comprises adjusting the content of the air contained in the thin film.

In one embodiment, adjusting the content of the air contained in the thin film includes adjusting the content of the air such that a volume percentage of the air is in a range of 15 to 50% based on 100 volume percentage of the thin film.

The air has a low dielectric constant. Thus, as the air content increases, the dielectric constant of the final manufactured thin film may be lowered to produce the low dielectric constant material based thin film.

In one embodiment, adjusting the content of the air contained in the thin film may include at least one of: adjusting a spacing between ink droplets in printing the nanoparticle-based ink composition using the inkjet printer; adjusting a packing density of the fluoropolymer nanoparticles in the nanoparticle-based ink composition; including a mixture of two or more types of the fluoropolymer nanoparticles having different particle sizes in the nanoparticle-based ink composition; including a mixture of two or more types of the ceramic nanoparticles having different particle sizes in the nanoparticle-based ink composition; or including a mixture of two or more types of the fluoropolymer nanoparticles having different particle sizes, and a mixture of two or more types of the ceramic nanoparticles having different particle sizes in the nanoparticle-based ink composition.

For example, during the inkjet printing, the spacing between ink droplets may be adjusted such that the air content in the thin film may be adjusted to be in a range of 40 to 45 vol %. Alternatively, the air content in the thin film may be adjusted to be in a range of 43 to 50 vol % by adjusting the packing density of the nanoparticles (including both the fluoropolymer nanoparticles and the ceramic nanoparticles) of the inkjet composition. Alternatively, when preparing the inkjet composition using nanoparticles of different sizes, the air content in the thin film may be adjusted to be in a range of 32 to 47 vol %. The above schemes may be used in combination with each other such that the air content in the thin film may be adjusted to be in a range of 15 to 50 vol %.

In one embodiment, a dielectric constant (Dk) of the thin film may be adjusted to be in a range of 1.5 to 2.0, and a dielectric loss (Df) of the thin film may be adjusted to be in a range of $1.7\times10^{-4}$ to $2.6\times10^{-4}$.

The inkjet printing scheme may be able to form fine patterns compared to screen printing or gravure printing scheme.

The inkjet printing is a printing technology that replaces various processes such as exposure, development, and etching and does not use hazardous substances, and replaces photolithography that causes significant material loss. The inkjet printing may be performed in a simple process of one-time printing and drying under atmospheric pressure. This inkjet printing technology may increase competitiveness, provide various customized designs, print only necessary parts, be environmentally friendly, and improve material use efficiency in the large-scale board and thus may be used in electronic circuit board printing. The ink material should also have the low-viscosity for high-speed injection, and long-term reliability necessary. It is desirable for the particles in the ink material to be nano-sized in order to have a sufficient filling density. In addition, the inkjet method may have better droplet quantification, may accurately and efficiently form complex three-dimensional shapes, and enables additive printing, making it possible to produce products with three-dimensional shapes. Furthermore, since prototypes according to various designs may be produced in a short period of time using the inkjet printing, the inkjet printing may be of great help in confirming the product design prior to mass production thereof, and may be also suitable for small-quantity production of various products.

Additionally, the inkjet printing scheme may apply the ink composition at high speed because an application area thereof is large. In addition, when the ink composition is sprayed, a fluid flow caused by solvent evaporation is generated and is precisely controlled to fill the fluoropolymer nanoparticles at a high filling level. Thus, the thin film may be formed by heat-treating the printed ink composition at a relatively low temperature, compared to a convention approach in which the ceramic powders are heat-treated at the high temperatures to form a thin film.

In one example, the inkjet printer of the present disclosure may use a plurality of nozzles, for example, 2 to 1024 nozzles, more preferably 10 to 50 nozzles.

In this regard, a thickness of the ink composition printed during one time printing may be determined based on a size of the nozzle of the inkjet printer. The nozzle may have a diameter of 15 μm to 100 μm. In particular, from the perspective of fine pattern formation, a ratio of the nanoparticle diameter and the nozzle diameter may be in a range of 1:20 to 500. This range may be preferable for the formation of the thin film composed of the fluoropolymer nanoparticles after discharging the inkjet printing composition, or for the formation of the thin film composed of the fluoropolymer nanoparticles and the ceramic nanoparticles after discharging the inkjet printing composition.

The fluoropolymer nanoparticles in accordance with the present disclosure may preferably be polytetrafluoroethylene nanoparticles.

A thickness of the thin film obtained through one-time printing may range from 1 μm to 20 μm.

The step of heat-treating the printed nanoparticle-based ink composition for inkjet printing may be performed at a temperature of 180° C. to 420° C. for 1 hour to 12 hours. More preferably, the heat-treatment may be carried out at a temperature of 300° C. to 320° C. for 1 hour to 5 hours. When the heat-treatment is performed at a temperature higher than the melting point of the fluoropolymer nanoparticles, a melting phenomenon may occur in the printed pattern, which may increase spreadability and thus make it difficult to form fine patterns. Therefore, it is more desirable to heat-treat the printed composition at a temperature lower than the melting point of the fluoropolymer nanoparticles.

In one example, in the heat-treatment, the printed composition may be heated to a specific temperature which may be maintained for a certain period of time. Alternatively, the printed composition may be heated to a number of specific temperatures, and each of the specific temperatures may be maintained for a certain period of time. In the latter case, the heat-treatment may be carried out at a first heat-treatment temperature, and then, at a second heat-treatment temperature lower than the first heat-treatment temperature, and then the temperature may be lowered to the room temperature. For example, first heat-treatment may be performed at a temperature of 300° C. to 320° C. for 30 minutes to 1 hour, and the, second heat-treatment may be performed at 200° C. to 300° C. for 1 hour to 3 hours, and then the temperature may be cooled down to the room temperature. The heat-treatment in multiple stages rather than in one stage may minimize the heat-treatment at the high temperature, thereby reducing a time duration for which the substrate is heated to high temperature, and may obtain a more uniform thin film compared to a scheme of rapidly lowering the temperature during subsequent cooling, and may minimize the spreadability due to melting of the fluoropolymer nanoparticles.

The heat-treatment is preferably performed in an electric furnace in a nitrogen atmosphere of 99% by mass or higher.

[Experiment Example 1] Inkjet Printing Using Polytetrafluoroethylene Nanoparticles To improve the dispersibility of the solvent, 10 g of the compound represented by the Chemical Formula 1 and 200 g of ethylene glycol are mixed with each other for 30 minutes using a homogenizer. 25 g of polytetrafluoroethylene nanoparticles are added to this mixed solution and are dispersed therein for 1 hour using a homogenizer. To adjust the viscosity, 100 g of deionized water is added thereto and the mixed solution is dispersed again using a homogenizer to complete the polytetrafluoroethylene nanoparticle-based ink composition.

The polytetrafluoroethylene nanoparticle-based ink composition is printed on a copper substrate using an inkjet printer. The printing is executed 20 times using 20 nozzles with a diameter of 70 μm. Thus, the printed composition of about 30 μm thick is formed on the substrate.

Figure 5:
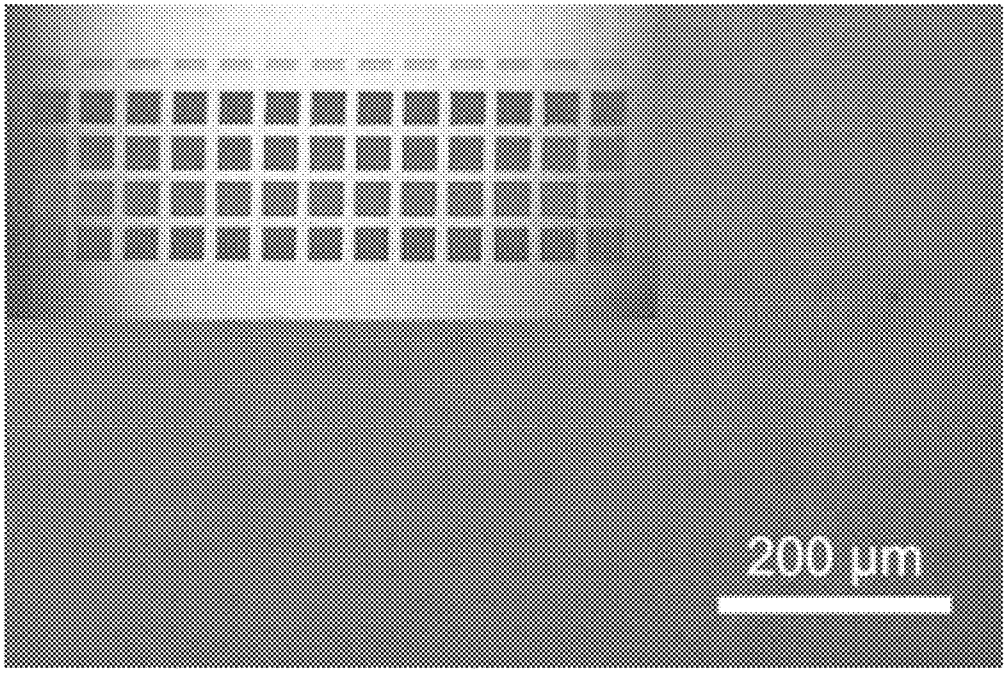
FIG. 5 shows a photo printed using the nanoparticle-based ink composition for inkjet printing according to an embodiment of the present disclosure.

This printed composition is exposed to heat of a temperature of 320° C. for 3 hours using an electric furnace containing therein nitrogen gas, such that the heat-treatment of the polytetrafluoroethylene particles is carried out such that the polytetrafluoroethylene thin film is completed, as shown in FIG. 5.

Figure 6:
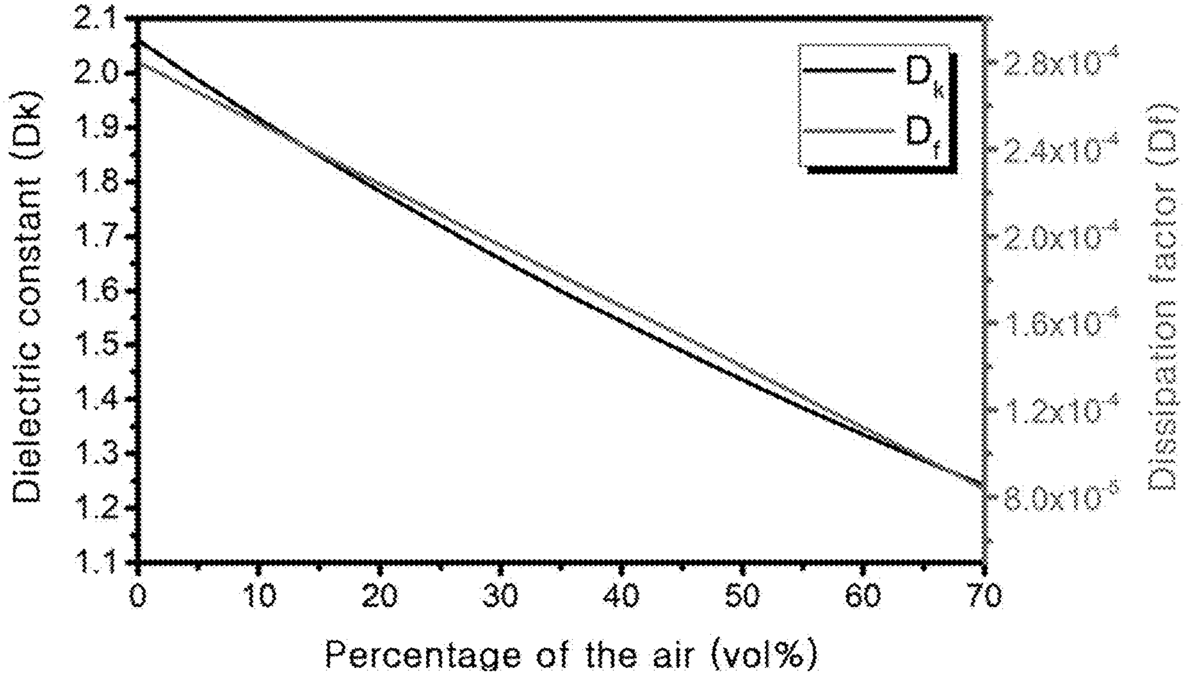
FIG. 6 is a graph measuring a dielectric constant and dielectric loss of a thin film manufactured using a nanoparticle-based ink composition for inkjet printing of the present disclosure in Experiment Example 1.

After separating the polytetrafluoroethylene thin film and the copper substrate from each other, the dielectric constant and dielectric loss of the polytetrafluoroethylene thin film in the 10 GHz frequency range may be identified using a vector network analyzer. The experimental results are shown in FIG. 6. Referring to FIG. 6, it may be identified that the thin film produced via the combination of the inkjet printing process and the heat treatment according to the present disclosure exhibits superior characteristics than existing commercially available substrate materials for ultra-high frequency.

[Experiment Example 2] Inkjet Printing Using Polytetrafluoroethylene Nanoparticles and Aluminum Oxide ($Al_2O_3$) Nanoparticles To improve the dispersibility of the solvent, 10 g of the compound represented by the Chemical Formula 1 and 200 g of ethylene glycol are mixed with each other for 30 minutes using a homogenizer. 25 g of polytetrafluoroethylene nanoparticles are added to this mixed solution and are dispersed therein for 1 hour using a homogenizer. To adjust the viscosity, 100 g of deionized water is added thereto and the mixed solution is dispersed again using a homogenizer to complete polytetrafluoroethylene dispersion.

Additionally, 15 g of a compound represented by the Chemical Formula 2 is mixed with 200 g of ethylene glycol, followed by mixing for 30 minutes using a homogenizer. 300 g of aluminum oxide nanoparticles (99%, Sumitomo Chemical Co., Ltd.) is added into the mixed solution, followed by dispersion for 1 hour using a homogenizer. 100 g of deionized water is added thereto to adjust the viscosity thereof, followed by dispersion again using a homogenizer to complete aluminum oxide dispersion.

The polytetrafluoroethylene dispersion and the aluminum oxide dispersion are mixed with each other, followed by mixing for 1 hour using a homogenizer. The mixed solution is further dispersed for 30 minutes using an ultrasonic crusher, such that the fluoropolymer-ceramic nanoparticle-based ink composition is completed.

The fluoropolymer-ceramic nanoparticle-based ink composition is printed on a copper substrate using an inkjet printer. Printing is performed 20 times using 20 nozzles with a diameter of 70 μm, such that an ink composition thin film about 30 μm thick is completed.

This ink composition thin film is exposed to a temperature of 320° C. for 3 hours using an electric furnace filled with nitrogen gas, the polytetrafluoroethylene particles in the ink composition thin film are heat-treated such that the fluoropolymer-ceramic thin film is completed.

Figure 7:
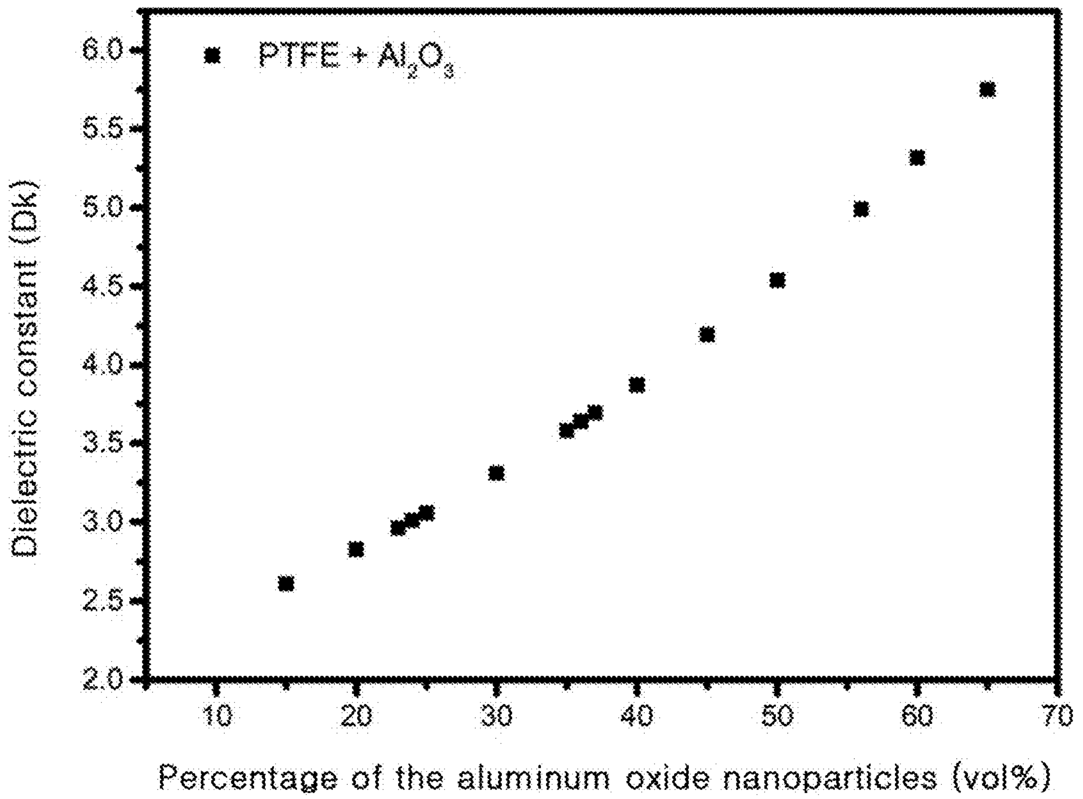
FIG. 7 is a graph measuring a dielectric constant of a thin film manufactured using the nanoparticle-based ink composition for inkjet printing based on a varying content of aluminum oxide nanoparticles in Experiment Example 2.

The thin film is prepared while adjusting the content of the aluminum oxide nanoparticles, and the dielectric constant thereof is measured, and the measurement result is shown in FIG. 7. FIG. 7 shows the dielectric constant and dielectric loss of the thin film manufactured using the nanoparticle-based ink composition for inkjet printing as obtained by Experiment Example 2 of the present disclosure. The result indicates that the thin film manufactured using the nanoparticle-based ink composition for inkjet printing as obtained by Experiment Example 2 of the present disclosure exhibits superior characteristics than those of existing commercially available substrate materials for ultra-high frequency.

The characteristics of the thin film obtained by nano inkjet printing method according to the present disclosure is as follows: in a range of 60% to 90% of a volume ratio as a packing density of the fluoropolymer nanoparticles, the dielectric constant (Dk) is in a range of 1.5 to 2.0, more preferably 1.7 to 1.8, and Df (dissipation factor) as the dielectric loss is in a range of $1.7\times10^{-4}$ to $2.6\times10^{-4}$, more preferably $1.9\times10^{-4}$ to $2.4\times10^{-4}$.

Experiment Example 3

Thin films as prepared by the method of [Experiment Example 1] as described above, having the thickness of 100 μm, and having the air content varying under varying printing conditions (a spacing between ink droplets) and varying heat-treatment time are prepared.

Figure 8:
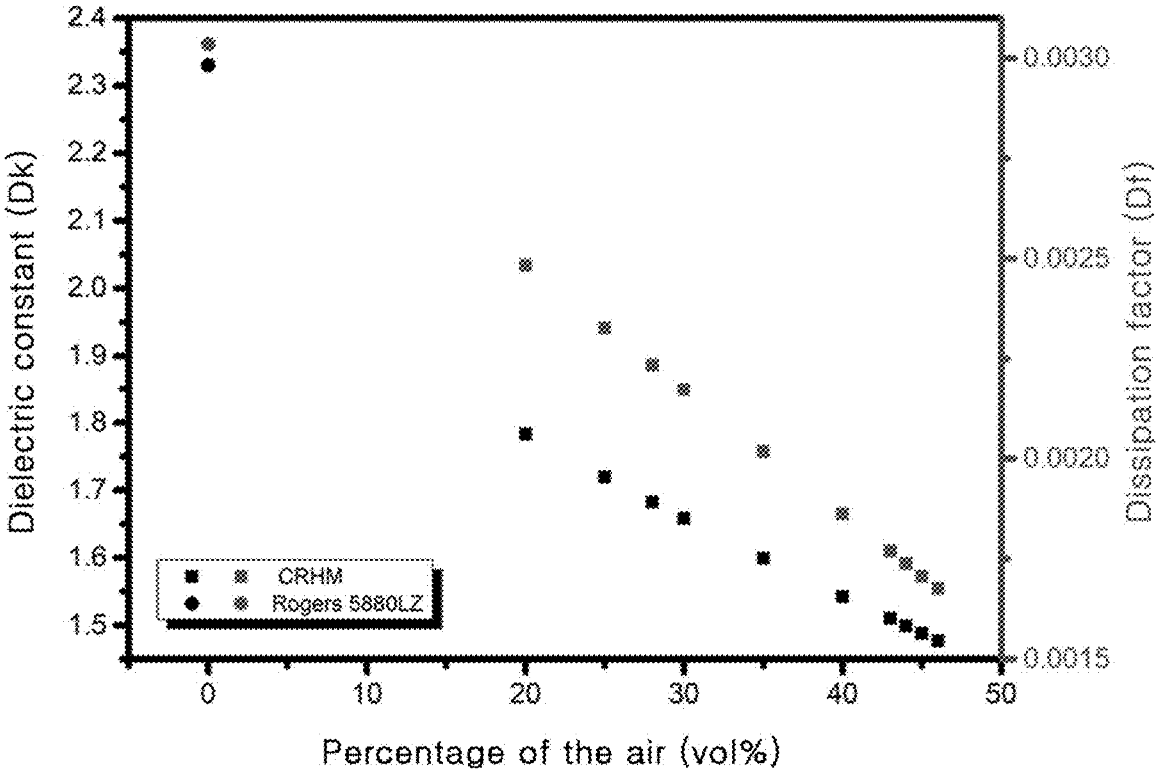
FIG. 8 is a graph measuring a dielectric constant and dielectric loss based on a content of air under a condition of 10 GHz in Experiment Example 3.

During the inkjet printing, the spacing between the ink droplets in each of column and row directions is changed in a range of 5 μm to 70 μm, such that ink composition thin films with varying packing densities is obtained, and then the ink composition thin films are subjected to heat-treatment for 10 minutes to 6 hours, such that the thin films with different air contents are obtained. The same experiment is performed on RT/duroid 5880LZ (purchased from Rogers) as Comparative Example. The results of Experiment Example 3 are shown in following Table 1 and FIG. 8. "CRHM" in FIG. 8 refers to the experimental result when using the nanoparticle-based ink composition for inkjet printing in accordance with the present disclosure, and "Rogers 5880LZ" refers to the experimental result when using Comparative Example.

TABLE 1

| Air content (vol %) | Dielectric constant | Dielectric loss |
|---|---|---|
| 20 | 1.78 | 0.00248 |
| 25 | 1.72 | 0.00233 |
| 28 | 1.68 | 0.00224 |
| 30 | 1.66 | 0.00217 |
| 35 | 1.60 | 0.00202 |
| 40 | 1.54 | 0.00186 |
| 43 | 1.51 | 0.00177 |
| 44 | 1.50 | 0.00174 |
| 45 | 1.49 | 0.00171 |
| 46 | 1.48 | 0.00168 |

Experiment Example 4

Figure 9:
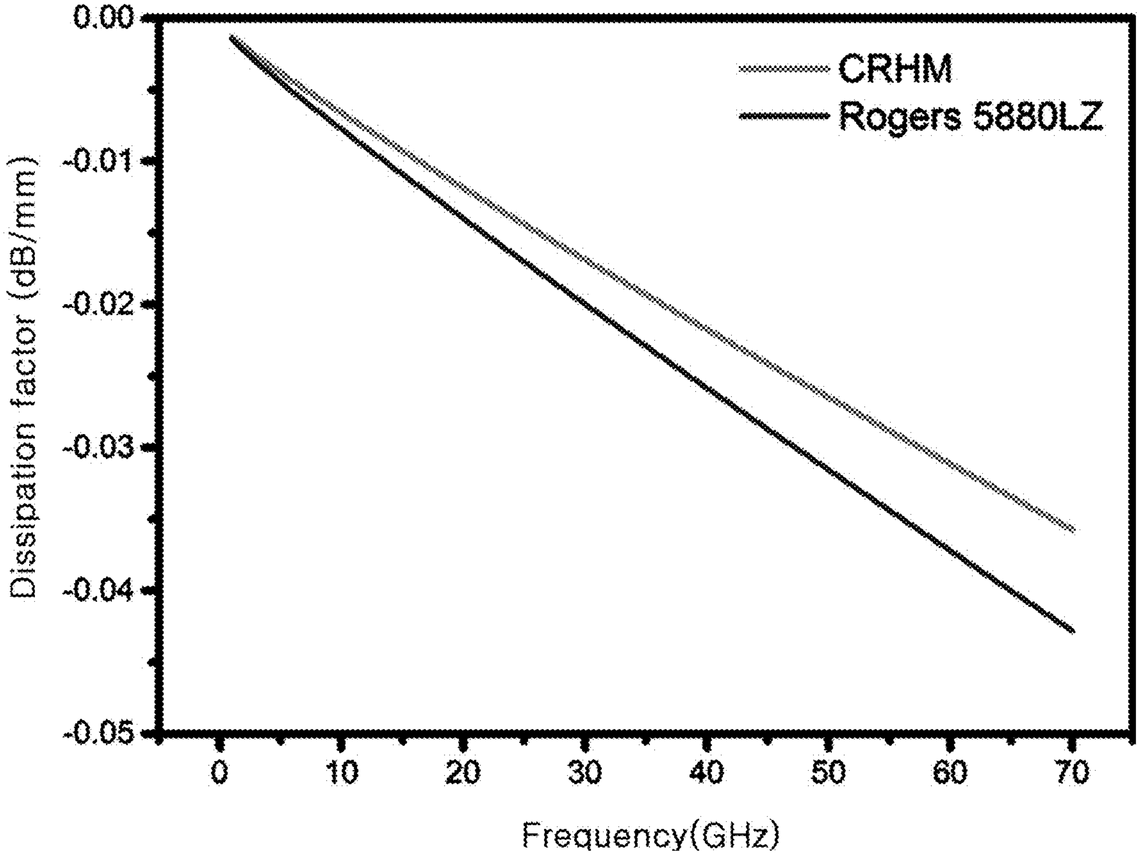
FIG. 9 is a graph of the dielectric loss of each of a thin film containing 46% air and 54% PFTE and Rogers' RT/duroid 5880LZ based on a frequency (up to 70 GHz) in Experiment Example 4.

The characteristics of each of the thin film with an air content of 46% (54% polytetrafluoroethylene (PTFE)) obtained in [Experiment Example 3] as Present Example and RT/duroid 5880LZ (purchased from Rogers) as Comparative Example are measured using a vector network analyzer as in [Experiment Example 1], while adjusting the frequency to be in a range of 1 to 70 GHz. The measurement result is shown in FIG. 9. In FIG. 9, a vertical axis represents the dielectric loss (dB/mm).

Experiment Example 5

Figure 10:
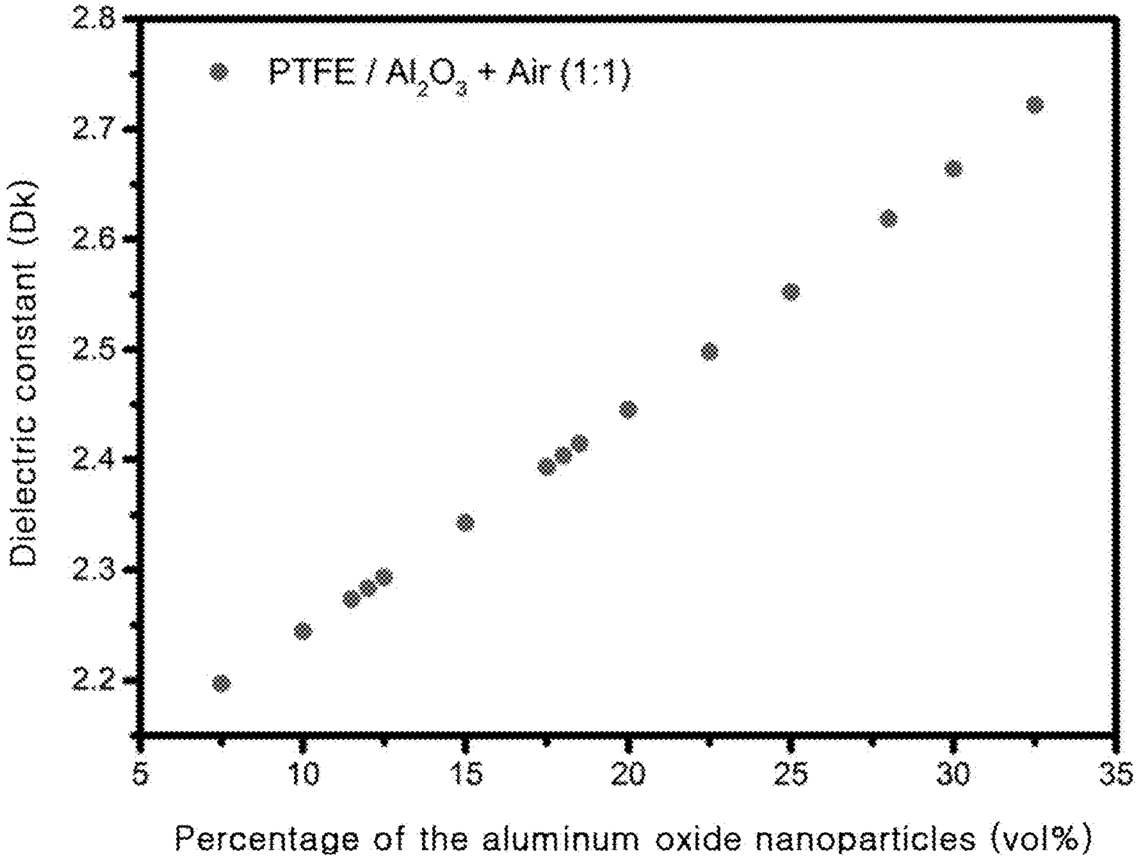
FIG. 10 is a graph showing change in a dielectric constant based on the content of air of a thin film in which air and aluminum oxide nanoparticles are contained at a volume ratio of 1:1 in Experiment Example 5.

A thin film is manufactured using the inkjet printing composition as prepared in [Experiment Example 2], while varying the printing condition and the heat-treatment condition as in [Experiment Example 3] and while a volume content ratio of air and the aluminum oxide nanoparticles is set to 1:1. Then, the dielectric constant of the thin film is measured and the measurement result is shown in FIG. 10.

The volume content of the aluminum oxide nanoparticles is adjusted to be in a range of 15% to 65%, such that the dielectric constant Dk of the thin film is adjusted to be in a range of 2.61 to 5.75. When one half of the aluminum oxide nanoparticles is replaced with air, the dielectric constant Dk thereof is adjusted to be in a range of 2.20 to 2.72.

Figure 11:
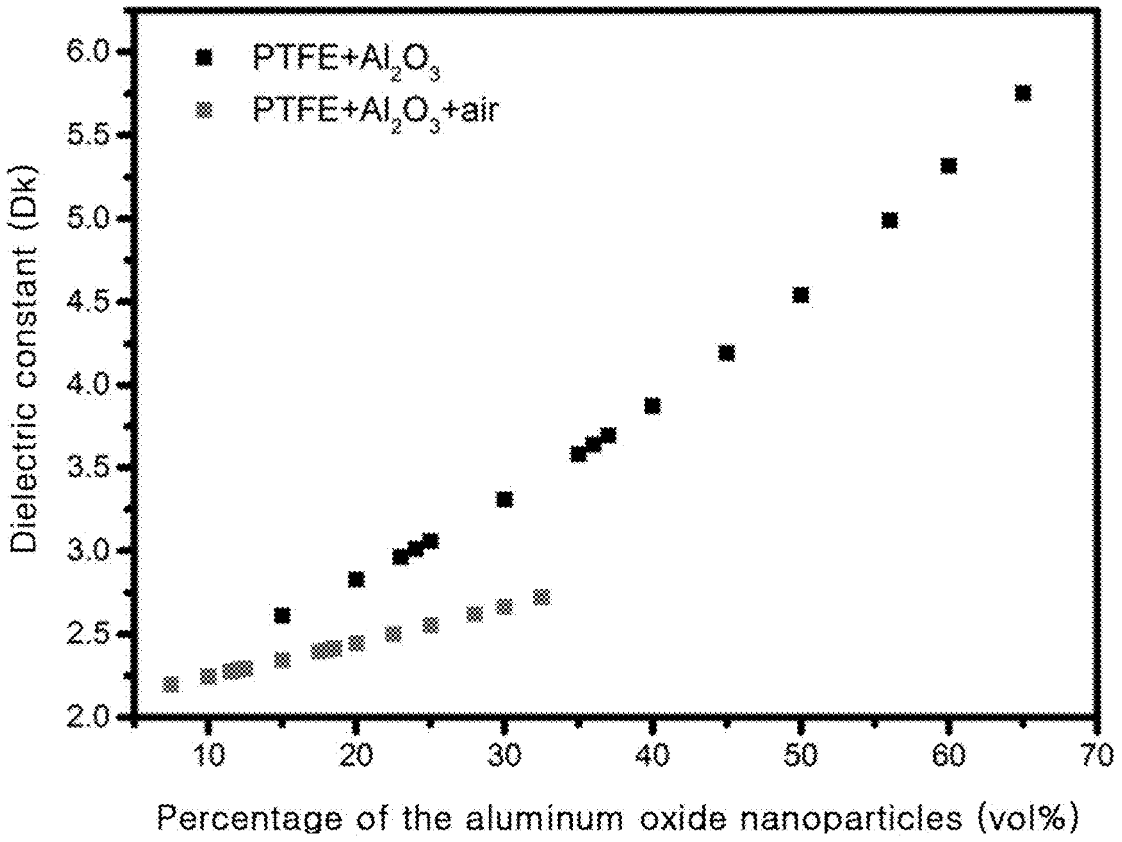
FIG. 11 is a graph showing an experimental result of FIG. 7 as the result of Experiment Example 2, and an experimental result of FIG. 10 as the result of Experiment Example 5 at the same time.

The data from [Experiment Example 2] and [Experiment Example 5] as described above are created into one graph which is shown in FIG. 11.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A method for preparation of a nanoparticle-based ink composition for inkjet printing, the method comprising:

(S10) mixing and dispersing a first dispersant with and in a first solvent;

(S20) mixing and dispersing fluoropolymer nanoparticles with and in a resultant product of (S10);

(S30) mixing and dispersing a first modifier with and in a resultant product of (S20);

(S40) mixing and dispersing a second dispersant with and in a second solvent;

(S50) mixing and dispersing ceramic nanoparticles with and in a resultant product of (S40);

(S60) mixing and dispersing a second modifier with and in a resultant product of (S50); and (S70) mixing a resultant product of (S30) and a resultant product of (S60) with each other and dispersing a mixture thereof, wherein the second dispersant includes at least one selected from a group consisting of a compound represented by a following Chemical Formula 2 and a compound represented by a following Chemical Formula 3:

[Chemical Formula 2]

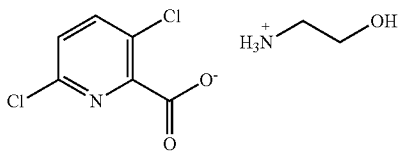

[Chemical Formula 3]

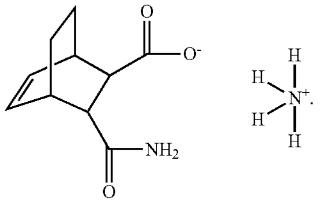

2. The method of claim 1, wherein the first dispersant includes at least one selected from a group consisting of a hydrocarbon-based compound, a chlorinated hydrocarbon-based compound, a cyclic ether-based compound, a ketone-based compound, an alcohol-based compound, a polyhydric alcohol-based compound, an acetate-based compound, a polyhydric alcohol and ether-based compound, and a terpene-based compound.

3. The method of claim 1, wherein the first dispersant is mixed with the first solvent and thus is diluted therewith, wherein a mixing weight ratio of the first dispersant and the first solvent is in a range of 1:5 to 1:500.

4. The method of claim 1, wherein the first modifier is mixed with the first solvent and thus is diluted therewith, wherein a mixing weight ratio of the first solvent and the first modifier is in a range of 1:0.5 to 1:9.

5. The method of claim 1, wherein a mixing weight ratio of the fluoropolymer nanoparticles and the first dispersant is in a range of 1:0.5 to 1:40.

6. The method of claim 1, wherein a mixing volume ratio of the ceramic nanoparticles and the fluoropolymer nanoparticles is in a range of 1:1 to 1:30.

7. The method of claim 1, wherein the first solvent and the second solvent are identical with or different from each other, wherein each of the first solvent and the second solvent includes at least one selected from a group consisting of deionized water, an alcohol compound, a glycol compound, a ketone compound, an ether compound, an ester compound, an imide compound, and an amide compound.

8. The method of claim 1, wherein the fluoropolymer nanoparticle includes at least one selected from a group consisting of a polytetrafluoroethylene (PTFE) nanoparticle, a fluoroethylenepropylene (FEP) nanoparticle, an ethylenetetrafluoroethylene (ETFE) nanoparticle, and a perfluoroalkoxy (PFA) nanoparticle.

9. The method of claim 1, wherein the ceramic nanoparticle includes at least one selected from a group consisting of a barium titanate nanoparticle, an aluminum oxide nanoparticle, an aluminum nitride nanoparticle, a boron nitride nanoparticle, a silicon carbide nanoparticle, and a beryllium oxide nanoparticle.

10. A nano inkjet printing method, the method comprising:

preparing a nanoparticle-based ink composition for inkjet printing using a method for preparation of the nanoparticle-based ink composition for inkjet printing, wherein the method comprises:

(S10) mixing and dispersing a first dispersant with and in a first solvent, (S20) mixing and dispersing fluoropolymer nanoparticles with and in a resultant product of (S10), and (S30) mixing and dispersing a first modifier with and in a resultant product of (S20);

printing the nanoparticle-based ink composition on a substrate using an inkjet printer; and heat-treating the printed nanoparticle-based ink composition to form a thin film, wherein the method further comprises adjusting a content of air contained in the thin film, and wherein adjusting the content of the air contained in the thin film includes adjusting the content of the air such that a volume percentage of the air is in a range of 15 to 50% based on 100 volume percentage of the thin film.

11. The method of claim 10, wherein in the nanoparticle-based ink composition, a mixing volume ratio of the ceramic nanoparticles and the fluoropolymer nanoparticles is in a range of 1:1 to 1:30.

12. The method of claim 10, wherein adjusting the content of the air contained in the thin film includes at least one of:

adjusting a spacing between ink droplets in printing the nanoparticle-based ink composition using the inkjet printer;

adjusting a packing density of the fluoropolymer nanoparticles in the nanoparticle-based ink composition;

including a mixture of two or more types of the fluoropolymer nanoparticles having different particle sizes in the nanoparticle-based ink composition;

including a mixture of two or more types of the ceramic nanoparticles having different particle sizes in the nanoparticle-based ink composition; or including a mixture of two or more types of the fluoropolymer nanoparticles having different particle sizes, and a mixture of two or more types of the ceramic nanoparticles having different particle sizes in the nanoparticle-based ink composition.

13. The method of claim 10, wherein the heat-treatment is performed at a temperature of 180° C. to 420° C. for 1 hour to 12 hours.

14. The method of claim 10, wherein a dielectric constant (Dk) of the thin film is adjusted to be in a range of 1.5 to 2.0, wherein a dielectric loss (Df) of the thin film is adjusted to be in a range of $1.7\times10^{-4}$ to $2.6\times10^{-4}$.

* * * * *